(12) United States Patent
Kang et al.

(10) Patent No.: US 10,035,139 B2
(45) Date of Patent: Jul. 31, 2018

(54) METHOD FOR IMPROVING SOLAR ENERGY CONVERSION EFFICIENCY USING METAL OXIDE PHOTOCATALYSTS HAVING ENERGY BAND OF CORE-SHELL FOR ULTRAVIOLET RAY AND VISIBLE LIGHT ABSORPTION AND PHOTOCATALYSTS THEREOF

(71) Applicant: KOREA ADVANCED INSTITUTE OF SCIENCE AND TECHNOLOGY, Daejeon (KR)

(72) Inventors: Jeung Ku Kang, Daejeon (KR); Dong Ki Lee, Daejeon (KR); Gyu Heon Lee, Daejeon (KR); Yong-Hoon Kim, Daejeon (KR); Ji Ii Choi, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 15/194,985

(22) Filed: Jun. 28, 2016

(65) Prior Publication Data
US 2017/0014813 A1    Jan. 19, 2017

(30) Foreign Application Priority Data

Jun. 29, 2015 (KR) .......................... 10-2015-0091886
May 9, 2016 (KR) .......................... 10-2016-0056592

(51) Int. Cl.
*B01J 23/06* (2006.01)
*B01J 23/18* (2006.01)
(Continued)

(52) U.S. Cl.
CPC ............. *B01J 27/24* (2013.01); *B01J 21/063* (2013.01); *B01J 23/755* (2013.01); *B01J 35/004* (2013.01);
(Continued)

(58) Field of Classification Search
CPC . B01J 21/063; B01J 23/06; B01J 23/18; B01J 23/20; B01J 23/22; B01J 23/30;
(Continued)

(56) References Cited

U.S. PATENT DOCUMENTS 7,303,723 B2 * 12/2007 Akbar ................... B82Y 30/00
                                                                    264/677
7,931,683 B2 *  4/2011 Weber .................. A61L 31/088
                                                                    623/1.42
(Continued)

FOREIGN PATENT DOCUMENTS

KR          10-0510049 B1       8/2005
KR          2006-0018751 A      3/2006
(Continued)

OTHER PUBLICATIONS

"Photocatalytic water splitting using semiconductor particles: History and recent developments," Kazuhiko Maeda. Journal of Photochemistry and Photobiology C: Photochemistry Reviews 12 (2011), pp. 237-268.*
(Continued)

*Primary Examiner* — Patricia L. Hailey
(74) *Attorney, Agent, or Firm* — Baker & Hostetler LLP

(57) ABSTRACT

The present invention discloses a method for improving solar energy conversion efficiency using metal oxide photocatalysts having an energy band of core-shell structure for ultraviolet (UV) ray and visible light absorption, comprising a first process of forming a nanoparticle thin film layer; a second process of preparing a core-shell metal oxide on metal oxide nanoparticles by a plasma reaction under a hydrogen and nitrogen gas atmosphere, and a third process of depositing a transition metal on surfaces of core-shell metal oxide nanoparticles to produce a photocatalyst for energy conversion. A great amount of oxygen vacancies is formed in a shell region by the core-shell metal oxide to
(Continued)

achieve effects of improving transfer ability of electron-hole pairs excited by light, and extending a wavelength range of absorbable light to a visible light region by changing a band-gap structure.

9 Claims, 12 Drawing Sheets

(51) Int. Cl.
*B01J 23/20* (2006.01)
*B01J 23/22* (2006.01)
*B01J 23/30* (2006.01)
*B01J 23/745* (2006.01)
*B01J 23/80* (2006.01)
*B01J 23/84* (2006.01)
*B01J 23/888* (2006.01)
*B01J 27/24* (2006.01)
*H01L 31/18* (2006.01)
*B01J 35/00* (2006.01)
*B01J 37/34* (2006.01)
*B01J 21/06* (2006.01)
*B01J 23/755* (2006.01)

(52) U.S. Cl.
CPC ......... *B01J 35/0033* (2013.01); *B01J 37/348* (2013.01); *B01J 37/349* (2013.01); *H01L 31/18* (2013.01)

(58) Field of Classification Search
CPC . B01J 23/745; B01J 23/80; B01J 23/84; B01J 23/8472; B01J 23/8476; B01J 23/888
USPC ....... 502/305, 307, 309–312, 316, 318, 319, 502/331, 338, 343, 345, 350, 353; 427/533, 569, 573, 576, 126.3, 126.6
See application file for complete search history.

(56) References Cited

U.S. PATENT DOCUMENTS

| | | | |
|---|---|---|---|
| 8,932,495 | B1 | 1/2015 | Nguyen et al. |
| 2007/0012355 | A1 | 1/2007 | LoCascio et al. |
| 2007/0132377 | A1 | 6/2007 | Yamazaki et al. |
| 2007/0252233 | A1 | 11/2007 | Yamazaki et al. |
| 2008/0161182 | A1 | 7/2008 | Jang et al. |
| 2010/0112349 | A1* | 5/2010 | Su ............... B01J 13/02 428/389 |
| 2010/0297447 | A1* | 11/2010 | Tadakuma ........ B01J 23/14 428/403 |
| 2013/0174898 | A1 | 7/2013 | Saitoh et al. |
| 2014/0041800 | A1 | 2/2014 | Okuyama et al. |
| 2014/0147377 | A1* | 5/2014 | Ho .............. C01B 3/042 423/658.2 |
| 2014/0174906 | A1* | 6/2014 | Landry .......... B01J 35/004 204/157.15 |
| 2014/0209478 | A1* | 7/2014 | Landry .......... B01J 35/02 205/340 |
| 2014/0261645 | A1* | 9/2014 | Hoertz ........... C25B 11/035 136/254 |
| 2014/0262806 | A1* | 9/2014 | Jennings ........ B01J 35/004 205/340 |
| 2014/0339072 | A1* | 11/2014 | Jennings ......... B01J 27/04 204/157.15 |
| 2014/0342254 | A1* | 11/2014 | Jennings ......... C01B 3/042 429/416 |
| 2016/0109777 | A1 | 4/2016 | Martin et al. |

FOREIGN PATENT DOCUMENTS

| | | |
|---|---|---|
| KR | 10-0950623 B1 | 4/2010 |
| KR | 10-1058735 B1 | 8/2011 |
| KR | 10-1310865 B1 | 9/2013 |

OTHER PUBLICATIONS

"Non-metal doping of transition metal oxides for visible-light photocatalysis," Roland Marschall et al. Catalysis Today 225 (2014), pp. 111-135.*
"Nitrogen-doping of bulk and nanotubular TiO2 photocatalysts by plasma-assisted atomic layer deposition," Yi Zhang et al. Applied Surface Science 330 (2015), pp. 476-486.*
Enhancing Visible Light Photo-oxidation of Water with TiO2 Nanowire Arrays via Cotreatment with H2 and NH3: Synergistic Effects between Ti3+ and N (J. Am. Chem. Soc. 2012, 134, 3659.
Core-Shell Nanostructured Black Rutile Titania as Excellent Catalyst for Hydrogen Production Enhanced by Sulfur Doping (J. Am. Chem. Soc. 2013, 135, 17831).
Effective nonmetal incorporation in black titania with enhanced solar energy utilization (Energy Environ. Sci. 2014, 7, 967).
U.S. Office Action dated Oct. 4, 2016, in U.S. Appl. No. 14/925,431.

* cited by examiner

METHOD FOR IMPROVING SOLAR ENERGY CONVERSION EFFICIENCY USING METAL OXIDE PHOTOCATALYSTS HAVING ENERGY BAND OF CORE-SHELL FOR ULTRAVIOLET RAY AND VISIBLE LIGHT ABSORPTION AND PHOTOCATALYSTS THEREOF

CROSS REFERENCE TO RELATED APPLICATIONS

This application claims priority to Korean Patent Applications Nos. 10-2015-0091886, filed on Jun. 29, 2015 and 10-2016-0056592, filed on May 9, 2016 in the Korean Intellectual Property Office, the entire disclosures of which are incorporated herein by reference.

BACKGROUND OF THE INVENTION

Field of the Invention

The present invention relates to a method for improving solar energy conversion efficiency using metal oxide photocatalysts having an energy band of core-shell structure for ultraviolet (UV) ray and visible light absorption, and photocatalysts thereof. More particularly, the present invention relates to a method for improving solar energy conversion efficiency including: a first process of performing heat treatment on a metal oxide semiconductor having a band-gap to form a nanoparticle thin film layer; a second process of contacting a plasma ball including mixed gas in a substitutional —NH or NHx radical state by a plasma reaction under a hydrogen and nitrogen gas atmosphere with a surface of a metal oxide particle to simultaneously generate a NH functional group and oxygen vacancies formed by hydrogenation, so as to prepare a core-shell metal oxide capable of absorbing UV ray and visible light by a single process at room temperature within 3 minutes; and a third process of further depositing a transition metal on surfaces of core-shell metal oxide nanoparticles to produce a photocatalyst of HN-metal oxide having a HN-core-shell structure for energy conversion.

In the above processes, a valence band maximum (VBM) level that can be occupied by electrons is raised by binding a —NH functional group to metal moiety of the metal oxide to increase an energy band of the metal oxide, thus enabling absorption of visible light. In addition, oxygen vacancies may be generated from the metal oxide using hydrogen, thus enabling the electrons excited on a core part of the metal oxide under UV ray to move into holes present in the shell. As a result, the core-shell metal oxide may be used to considerably increase amounts of the electrons and holes excited in a shell region under UV ray and visible light, thus controlling the energy band.

The production of a core-shell metal oxide through an oxygen vacancy formation process using —NH and hydrogen proposed in the present invention may be applied to a broad range of metal oxide semiconductor photocatalyst materials including, for example, $TiO_2$, ZnO, CuO, etc. In addition, any material treated by the above processes may have characteristics capable of: 1) extending a range of absorbable light wavelengths, 2) increasing a major carrier density, 3) enabling fast transfer of electron-hole pairs excited by light energy to an outside before these are recombined and disappear, and 4) improving overall oxidation/reduction reaction characteristics of the metal oxide, and thereby, it is possible to employ the core-shell metal oxide in a broad range of applications including not only solar energy conversion catalysts of carbon dioxide but also various fields based on the metal oxide semiconductor such as production of solar cells, disinfection of bio-microorganisms, and the like.

Description of the Related Art

Carbon capture and utilization (CCU) is an advanced eco-friendly energy circulation technique, which is based on the photosynthesis principle in nature to produce different hydrocarbon compounds such as carbon monoxide (CO), methane ($CH_4$), methanol ($CH_3OH$), formic acid (HCOOH), etc. by using solar energy, water and $CO_2$. The purpose of the CCU technique is essentially to develop a photocatalyst with the possibility of realizing an artificial photosynthesis technique that oxidizes water ($H_2O$) with received solar energy, and at the same time, reduces $CO_2$. The metal oxide photocatalyst including representative examples such as $TiO_2$ or ZnO has excellent economic advantages, stability of reaction, durability and non-harmful effects on the human body and environment, compared to other catalytic materials. Nevertheless, due to very low solar energy conversion efficiency, utilization of the above technique has been limited Major reasons of the low energy conversion efficiency may be as follows: 1) due to the wide band-gap, only solar light in the UV range can be used as an energy source, therefore, only 4% of the whole solar spectrum is used at most; and 2) due to characteristics of semiconductor materials, the photogenerated electron-hole pairs cannot be reliably separated and have a high probability of recombination, this results in minimal utilization in final oxidation/reduction reactions.

In order to overcome such factors causing a decrease in efficiency as described above, a representative method may include introducing different metal and non-metal elements into a crystalline structure of existing metal oxides to vary a binding energy or charge density between constituent atoms inside the crystal, thereby reducing a size of the band-gap and enhancing an electron-hole transfer rate. However, in case of introducing metal elements, a conduction band minimum (CBM) level essential in the reduction reaction of $CO_2$ and $H_2$ is significantly changed. On the other hand, when introducing non-metal elements, a number of defect sites which cause an increase in the electron-hole recombination rate are generated in the crystalline structure. Therefore, each of the above treatments still requires additional complementary processes.

The present invention proposes a simple treatment method that utilizes an oxygen vacancy formation process using —NH group and hydrogen to produce a core-shell metal oxide capable of absorbing UV ray and visible light from the metal oxide, respectively, so as to improve electron-hole transfer characteristics and increase an applicable wavelength range. Meanwhile, the conventional plasma process has been executed by exposing a metal oxide material under a hydrogen gas atmosphere at a high temperature and a high pressure (200° C., 10 bar or more), for at least one day. Further, the conventional nitrogenation process has been mostly executed by treating an ammonia gas at a high temperature of at least 500° C. for 1 hour or more. However, when these two processes are separately conducted, the non-metal elements inserted into metal oxide crystals are released out of the crystals at a temperature of 300° C. or more, therefore, desired effects cannot be achieved. On the other hand, when these two processes are conducted in combination, high reactive gases are mixed at a high temperature to cause a danger of explosion, hence entailing a limitation in the practical use thereof. Korean Patent Laid-Open Publication No. 2006-0018751 discloses low temperature plasma treatment, however, this treatment is executed at 50° C. for 30 minutes. In contrast, the present invention relates to organic material degradation, which exhibits non-comparably lower efficiency compared to such a process of treating at room temperature for 3 minutes, has relatively low utility in terms of characteristics, and is easily reactive. However, the present inventive method utilizes a single process, instead of such step-by-step processes as described above, to generate —NH molecules and bind —NH to a metal atom moiety in the shell region of the metal oxide so as to increase an energy band of VMB, and thereby forming electron-holes in a visible light region. A technique capable of producing —NH in a single process, which was not generated by the conventional step-by-step process using hydrogen plasma and nitrogen plasma, has been assured, thus overcoming a limitation in transferring electron-holes onto a surface of the metal oxide under UV ray and/or visible light, which could not be attained in the conventional step-by-step process. Therefore, the above technique becomes applicable to energy conversion catalysts. In addition, the hydrogen used in the single process may generate oxygen vacancies in the shell region, thus efficiently forming electrons-holes under UV ray and/or visible light and actively transferring the electrons-holes toward the surface of the catalyst particles. As a result, a metal oxide catalyst applicable to energy conversion could be successfully manufactured.

Metal oxide nanoparticles provided by the present invention may have some characteristics capable of: 1) extending a wavelength range of absorbable light to the visible light region while preserving a required energy band level for $CO_2$ reduction and water oxidation; 2) noticeably increasing an electron carrier density; 3) quickly transferring the electron-hole pairs excited by light energy out of the nanoparticles due to energy levels newly created in the metal oxide band-gap of the above-described core-shell structure before these are recombined and disappear; and therefore, 4) remarkably improving overall oxidation/reduction reaction characteristics of the metal oxide. Further, depositing a transition metal on the surface of such the core-shell metal oxide may enable solar energy conversion of carbon dioxide into methanol or carbon monoxide.

Although the same prior art as the present invention is not yet disclosed, some conventional arts similar thereto may be described as follows:

1) Korean Patent Registration No. 10-0950623 (a method for increasing compression stress of PECVD silicon nitride films): a technique for enhancing compression stress characteristic of a silicon-nitride coating film, which includes depositing a silicon-containing precursor on a semiconductor element by treatment of the precursor using $H_2$ gas plasma and mixed plasma of $H_2$ and $N_2$ gases, in a sequential order.

2) Korean Patent Registration No. 10-1058735 (a solar cell and a method of manufacturing the same): a technique for manufacturing a solar cell electrode with enhanced passivation effects, which includes forming an insulating film having a hydrogen content of less than 10% on the surface of a semiconductor electrode through silane and ammonia mixed gas plasma treatment.

3) Korean Patent Registration No. 10-1310865 (a method and an apparatus for manufacturing a nanoparticle composite catalyst by plasma ion implantation): a technique for manufacturing a homogenized nanoparticle composite catalyst using a small amount of catalyst components, which includes injecting solid elements instantly ionized through solid element plasma ion implantation into a porous carrier substrate.

4) Korean Patent Registration No. 10-0510049 (a simultaneous desulfurization and denitrogenation method using a combination process of low temperature plasma and low temperature catalyst, and an apparatus used for the same): a technique for neutralizing nitrogen oxides and sulfur oxides contained in an exhaust gas, followed by removing the same through catalysis, which includes charging the exhaust gas in a low temperature plasma reactor filled with ammonia and propylene.

Other than the above four patent cases proposed as the representative examples, most of the conventional arts are concentrated on the improvement of physical properties, neutralization and treatment of harmful gases, and production of nanoparticles and a uniform coating film, which are substantially independent of the present invention with the purpose of improving photochemical catalytic conversion properties. Alternatively, it has been developed a process technique which includes: synthesizing a core-shell structure capable of absorbing UV ray and visible light through —NH production by a single process used in the present invention and through formation of oxygen vacancies using hydrogen; and then treating the surface of such a core-shell metal oxide material using a transition metal such as Cu, so as to develop an energy conversion catalyst. Therefore, these patents have essential differences in technical configurations, as compared to application of two different element treatment characteristics in a single process.

Further, other similar conventional arts disclosed in research papers are as follow:

1) Enhancing Visible Light Photo-oxidation of Water with $TiO_2$ Nanowire Arrays via Cotreatment with $H_2$ and $NH_3$: Synergistic Effects between $Ti^{3+}$ and N (J. Am. Chem. Soc. 2012, 134, 3659): a technique for hydrogenation and nitrogenation of $TiO_2$ nanowires by sequentially treating the same with hydrogen and ammonia gases at 500° C. for 1 hour, respectively.

2) Core-Shell Nanostructured Black Rutile Titania as Excellent Catalyst for Hydrogen Production Enhanced by Sulfur Doping (J. Am. Chem. Soc. 2013, 135, 17831): a technique including heat treatment of $TiO_2$ nanoparticles with aluminum at 800° C. for 6 hours to conduct reduction of the surface of the nanoparticles, followed by flowing $H_2S$ gas at 600° C. for 4 hours to inject a sulfur element into $TiO_2$ while providing hydrogenation-like effects thereto.

3) Effective nonmetal incorporation in black titania with enhanced solar energy utilization (Energy Environ. Sci. 2014, 7, 967): application of various elements for implantation such as hydrogen, sulfur, iodine and nitrogen, in the same technical method as disclosed in the research paper of 2).

These published research papers describe techniques for hydrogenation of metal oxides and insertion of other non-metal elements by using reactive gases such as ammonia, hydrogen sulfide, etc. through at least two separate processes at a high temperature of at least 500° C. or more for a relatively long time of 1 hour or more. Therefore, such technical methods as described above are significantly different from the method proposed and realized by the present invention.

PRIOR ART DOCUMENT AND PATENT DOCUMENT

Prior Art Document

J. Am. Chem. Soc. 2012, 134, 3659

Patent Document

Korean Patent Registration No. 10-1310865

SUMMARY OF THE INVENTION

The metal oxide semiconductor photocatalyst has excellent performance in aspects of being economical effect, durability and reaction stability, but has a low electron-hole formation efficiency since only 4% usability of solar energy incident on a ground surface due to a wide band-gap and high electron-hole recombination but not absorbing light in the visible light region occupying about 48% of the solar energy. That is, the number of electron-holes participating in the final redox reaction is considerably limited, hence exhibiting a very low numerical value of solar energy conversion efficiency. Among representative methods for improving such low energy conversion efficiency, there have been proposed a variety of illustrative examples to introduce metal/non-metal elements into metal oxide crystals. However, these methods did not overcome the above-two described problems, hence still requiring additional complementary treatment.

In order to solve the above problems, the present invention provides a method for improving solar energy conversion efficiency including: a first process of performing heat treatment on a metal oxide semiconductor having a band-gap to form a nanoparticle thin film layer; a second process of contacting a plasma ball including mixed gas in a substitutional —NH or NHx radical state by a plasma reaction under a hydrogen and nitrogen gas atmosphere with a surface of a metal oxide particle to simultaneously generate a NH functional group and oxygen vacancies formed by hydrogenation, so as to prepare a core-shell metal oxide capable of absorbing UV ray and visible light by a single process at room temperature within 3 minutes; and a third process of further depositing a transition metal on surfaces of core-shell metal oxide nanoparticles to produce a photocatalyst of HN-metal oxide having a HN-core-shell structure for energy conversion. Herein, the shell region of the core-shell metal oxide nanoparticles of the present invention may absorb the visible light and involve formation of a great amount of oxygen vacancies. In view of chemical effects, a size of the band-gap is decreased while improving electron-hole pair transfer ability, thereby, it is possible to utilize as a catalyst enabling degradation of water using a photo energy and conversion of carbon dioxide.

The second process may include: depositing metal oxide nanoparticles on a substrate (support) in a thin film form utilizing a deposition method such as electrophoresis and etching, spin coating, doctor blading, sputtering, atomic layer deposition (ALD), etc. to form a metal oxide thin film layer; and performing thermal treatment on the metal oxide thin film layer and the substrate in a temperature range of their phase transition temperature or less, so as to increase a binding force between the metal oxide layer and the substrate.

The third process of the present invention is a technique to deposit a different transition metal on the surface of the core-shell metal oxide, and may include binding a variety of transition metals such as Cu, Pt, etc. to the surface of the prepared core-shell metal oxide nanoparticles, thereby manufacturing a catalyst enabling selective energy conversion.

Further, in order to achieve the above-described objects, the present invention provides a method for manufacturing a metal oxide catalyst material, including formation of oxygen vacancy using —NH and hydrogen, thereby exhibiting an extended wavelength range in which electrons-holes are generated by sensing light, and increased electron carrier density and electron-hole separation ability.

Technical objects of the present invention are not particularly limited to those described above, and other technical objects not described herein will also be clearly understood by a person who has a common knowledge in the technical field to which the invention pertains.

According to the present invention, it is possible to generate oxygen vacancies using —NH and hydrogen on a metal oxide having a large band-gap in a single process at room temperature within several minutes, to enable absorption of both of UV ray and visible light. Also, the present invention provides a technique for controlling an energy band to actively transfer electrons-holes, thereby maximizing catalyst characteristics of the metal oxide.

When —NH substitutes for a metal element in a metal oxide crystal to be inserted therein, this may raise a valence band maximum (VBM) level while not affecting a conduction band minimum (CBM) level to extend an absorption wavelength range at which electron-hole pairs may be generated, thereby enabling to use solar energy in a broader range. Further, when a hydrogen element is inserted into the metal oxide, a great amount of oxygen vacancies is formed on the surface of the metal oxide to achieve some effects of greatly increasing an electron carrier density and separating the electrons and holes from each other before the photo electron-hole pairs excited by light are recombined and disappear. Further, when —NH invades and is inserted between a metal element and the oxygen element, this may form an independent energy level at a higher level than the VBM level of the existing metal oxide or the VBM level formed through simple substitutive insertion of nitrogen. Therefore, similar to the above-described effects, it may exhibit effects of fast separating holes from the electrons-holes excited by light before these are recombined and disappear.

By the single process proposed in the present invention, high-active hydrogen nitride ($NH_x$) radicals as well as H are generated. In this regard, by directly contacting plasma balls containing these radicals to the surface of the metal oxide, as shown in FIG. 1, fast treatment could be executed by the single process at room temperature. In addition, due to characteristics of the treatment method according to the present invention, the above-described hydrogenation and nitrogenation effects are mostly concentrated on the surface of particles in the metal oxide, resulting in a hydrogenated and nitrogenated core/shell structure while preserving initial characteristics of metal oxide, as shown in FIG. 2. Accordingly, the number of photoexcited electrons and holes at the surface of the particles is greatly increased. In addition, photoexcited electrons and holes inside of particles can be rapidly transported to the surface by the energy levels created at the surface (see FIG. 3). Accordingly, compared to untreated metal oxide, the amount of electrons and holes participating in oxidation/reduction catalysis is significantly increased to thus remarkably improve the catalysis efficiency.

BRIEF DESCRIPTION OF THE DRAWINGS

The above and other objects, features and other advantages of the present invention will be more clearly understood from the following detailed description taken in conjunction with the accompanying drawings, in which:

FIG. 7 is views illustrating: a) an electron state density of anatase $TiO_2$ crystal including $N_s$ and $N_iH$; and b) a mid-gap and c) a distribution of electrons at a VBM level, respectively, in the electron state density shown in FIG. 7a;

DETAILED DESCRIPTION OF THE INVENTION

Figure 1:
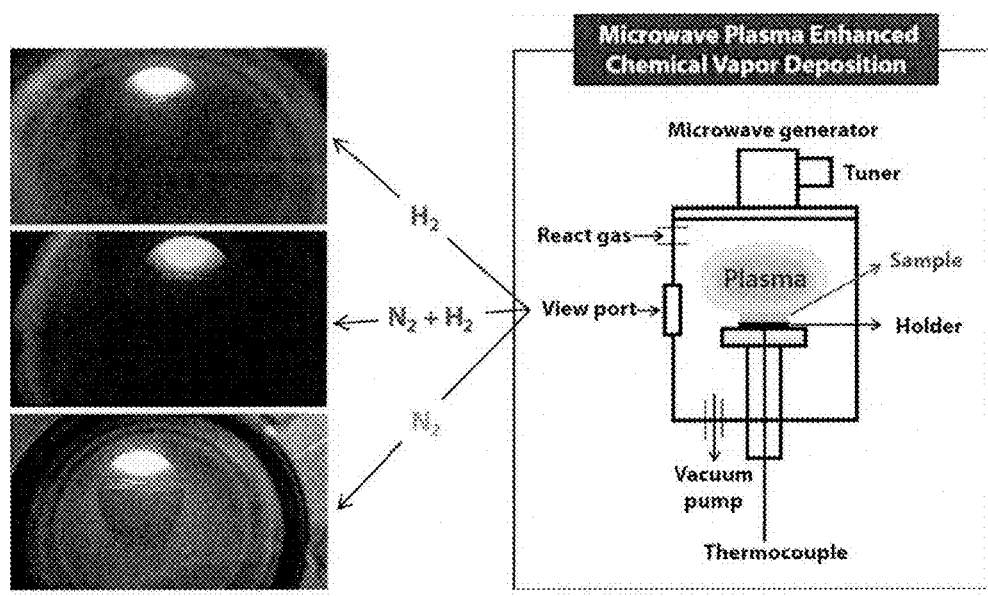
FIG. 1 is a view illustrating nitrogenation and hydrogenation of a metal oxide thin film sample through a mixed gas plasma reaction using a MPE-CVD device in a manufacturing process according to the present invention, wherein different colors of a ball generated through a plasma reaction depending on types of gases injected inside a reactor (hydrogen: dark blue, nitrogen: pink, hydrogen+nitrogen: violet) are shown through the view port. The different colors of each plasma reaction indicated that the different types of radicals were created depending on the reaction gases.

The present invention proposes a photocatalyst manufacturing method in which mass-production is possible and high effects are achieved at low costs by a simple method through hydrogenation and nitrogen/hydrogen (—NH) treatment in a single process at room temperature within a short time. In particular, the present invention provides a treatment method of increasing the number of electrons/holes capable of participating a desired catalytic reaction, thereby improving catalytic properties of a metal oxide.

The metal oxide proposed in the present invention is not particularly limited to titanium dioxide ($TiO_2$) but may include any metal element having n-type semiconductor properties, and may be broadly employed to improve catalytic properties of the metal oxide consisting of at least one selected from Ti, V, Fe, Ni, Cu, Zn, Sn, Ta, W and Bi.

Example 1

A method of fabricating a photoelectrochemical electrode is as follows. 100 mg of anatase $TiO_2$ nanoparticles having a particle diameter of about 25 nm was sufficiently dispersed in 50 ml of acetone solution containing 20 mg of iodine dissolved therein. Two nickel foils were immersed in the prepared solution so as to face each other, and then, 100V DC was applied to the same for 1 minute, to form a $TiO_2$ nanoparticle thin film layer having a thickness of about 250 nm on the nickel foil side of a cathode. The $TiO_2$ thin film sample was subjected to heat treatment at 500° C. in an air atmosphere for 40 minutes to improve adhesion between the thin film layer and the nickel foil substrate and, at the same time, to remove organic impurities formed in the thin film fabrication process. A variety of metal oxides such as V, Fe, Cu, Zn, Ta, W or Bi, etc. metal oxide nanoparticles (<50 nm) may also be fabricated into a photoelectrochemical electrode by the same process as described above.

The as-prepared metal oxide thin film was placed in a reactor of a chemical vapor deposition device (e.g. a microwave plasma enhanced chemical vapor deposition, MPE-CVD) for possible gas plasma treatment, and prepared to be under a vacuum atmosphere of $3\times10^{-3}$ Torr or less. Thereafter, while flowing a mixed gas containing $H_2$ and $N_2$ gases in a mixing ratio of 1:2 into the reactor at an overall 100 sccm flow rate, an outer surface of a plasma ball containing H and $NH_x$ radicals formed thereon has contacted with the surface of the metal oxide thin film by causing a gas plasma reaction under a condition of 500 W output power and controlling the same, followed by maintaining this state for 3 minutes. Herein, a distance between the plasma ball and the surface of the metal oxide thin film is controlled through atmospheric control inside the reactor. This distance is substantially different according to a thickness of the overall thin film including the substrate and the metal oxide layer, type and flow rate of a reactive gas, output power for plasma generation, etc., and therefore, may be variably controlled in a range of 1 to 30 Torr. Furthermore, a contact time between the plasma ball and the surface of the metal oxide thin film may also be variably controlled according to a desired degree of treatment. In addition, $H_2$ and $N_2$ gases may be controlled in a mixing ratio of 1:1, 1:2 or 1:3.

Example 2—Fabrication of HN—$TiO_2$—Cu Catalyst

A method for fabricating a transition metal thin film serving as a co-catalyst for the HN—$TiO_2$ photoelectrochemical thin film electrode prepared by the above-described method is as follows. Using a RF magnetron sputtering device, a transition metal target such as Cu, Pt, Co, etc. was deposited on the prepared HN—$TiO_2$ thin film sample. After injecting argon gas, a pressure was adjusted to 12 mTorr and the deposition was performed under a RF power (Radio Frequency) of 100 W for 0 to 120 seconds. A weight of the deposited co-catalyst was measured using an ultra-micro balance and was controlled to be 1% or less as compared to $TiO_2$ thin film. The transition metal-deposited sample was subjected to heat treatment under a temperature condition of about 100° C. and in nitrogen and hydrogen gas atmosphere for 1 hour, thereby improving adhesiveness and crystallinity.

Example 3—Production of C1 Compound Using HN—$TiO_2$—Cu Catalyst

A measurement method of photochemical conversion efficiency from photochemical carbon dioxide to another carbon compound is as follows. In order to maximize the catalysis efficiency, platinum or copper (serving for reduction of carbon dioxide) and a cobalt oxide thin film were deposited on the fabricated HN—$TiO_2$ thin film using a RF magnetron sputtering device. After placing the prepared sample in a sealed stainless steel container, air was discharged and an inside of the container was became a saturated condition using carbon dioxide gas (99.9%) at a temperature of about 70° C. Then, after pouring a small amount of deionized water therein, the temperature was maintained at 70° C. for about 1 hour in order to sufficiently evaporate the reactants in the reactor. For photochemical catalytic reaction, a quartz glass at the top of the container was irradiated with light using a light simulator (AM 1.5G filter, 200 mWcm$^{-2}$) to conduct a reaction. Amounts of the generated substances, that is, carbon monoxide and methanol, respectively, were measured in real time by using measurement devices of a flame ionization detector (FID) and a pulsed discharge helium ionization detector (PDHID) in gas chromatography equipment.

Experimental Example

Figure 4:
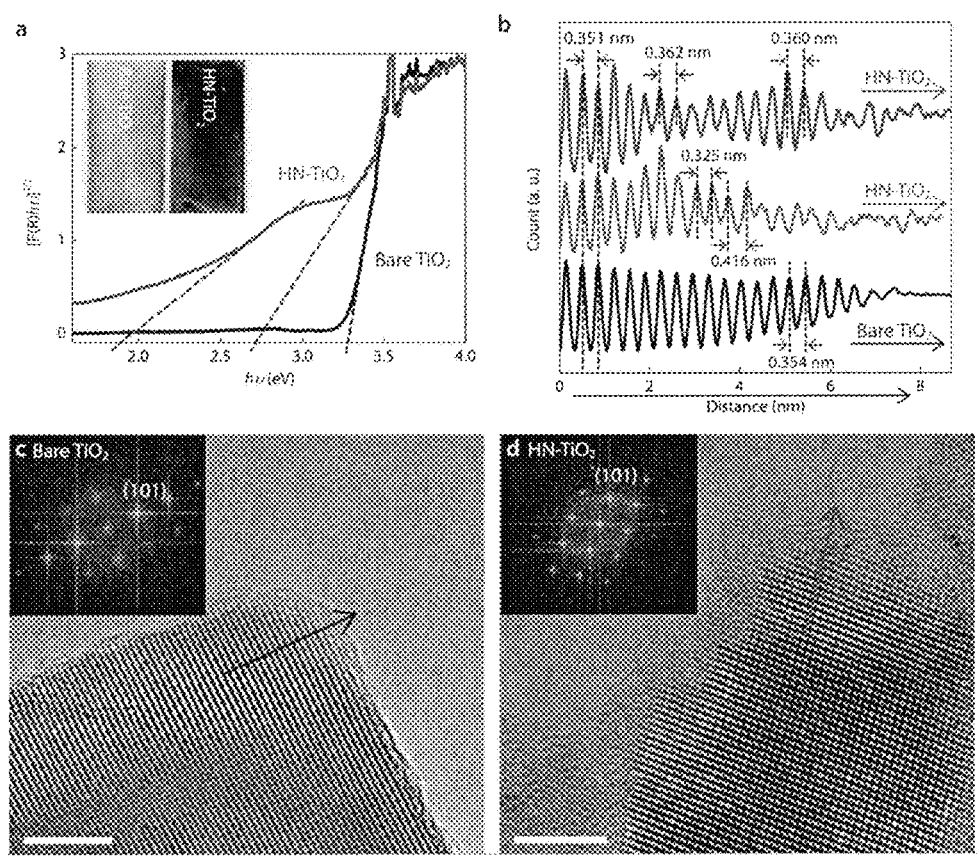
FIG. 4 is views illustrating: a) measured results of light absorbance before (bare $TiO_2$) and after (HN—$TiO_2$) $H_2/N_2$ mixed gas plasma treatment converted into Tauc relationship, as well as photographs of samples; b) lattice distances measured along different color arrows shown in FIGS. 4c and 4d; and c) and d) TEM measurement photographs of bare $TiO_2$ nanoparticle and HN—$TiO_2$ nanoparticle, respectively.

FIG. 4 illustrates changes in light absorbance and crystallinity between a $TiO_2$ nanoparticle (HN—$TiO_2$) on which mixed gas plasma treatment was executed according to the above-described method and a $TiO_2$ nanoparticle (bare $TiO_2$) without any treatment. As shown in the inset of FIG. 4a, a conventional white $TiO_2$ thin film changed into a dark yellow color by the plasma treatment and showed a great increase in light absorbance characteristics in a visible light region after plasma treatment, as observed in the light absorbance curve of each sample in FIG. 4a, which was prepared using the Tauc relationship. As a result of calculating a size of the band-gap for each sample using x intercepts of the graph shown in FIG. 4a, it was observed that the bare $TiO_2$ had 3.27 eV while HN—$TiO_2$ showed a decrease to 2.71 eV. Further, existence of an additional band-gap with a size of 1.92 eV was observed.

Figure 2:
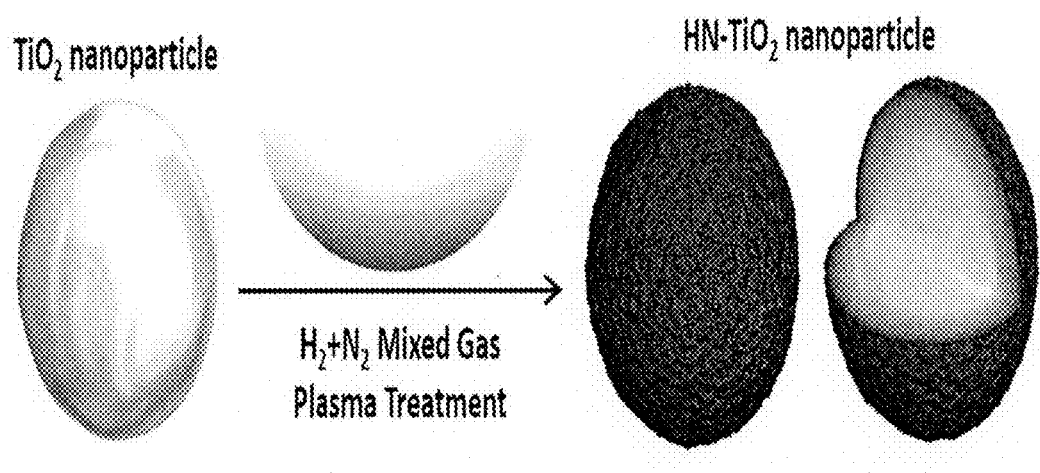
FIG. 2 is a view illustrating a process of changing a $TiO_2$ nanoparticle to a core-shell structure (HN—$TiO_2$) by mixed gas plasma treatment according to the present invention.

FIGS. 4c and 4d illustrate transmission electron microscopy (TEM) photographs of a single nanoparticle in each sample, respectively. The bare $TiO_2$ nanoparticle in FIG. 4c showed the same anatase (101) plane in both of the inside and the outside of the nanoparticle, however, the HN—$TiO_2$ in FIG. 4d showed that a crystalline structure of the anatase (101) plane is maintained on the inside while the outside thereof was observed to have irregularly altered crystalline properties. Further, FIG. 4b also illustrates results of an interplanar distance measured along the arrows shown in FIGS. 4c and 4d. Red and blue curves in FIG. 4b show the interplanar distance measured along the arrows with these colors, respectively, present in TEM photographs of HN—$TiO_2$ nanoparticle in FIG. 4d, while a black curve shows the interplanar distance measured along the arrow in FIG. 4c. All of the three curves have the same interplanar distance inside the particle of 0.351 nm to indicate the anatase 101 face. However, for HN—$TiO_2$, it was observed that the interplanar distance changes irregularly from the minimum of 0.325 nm to the maximum of 0.416 nm toward the outside thereof. Due to this phenomenon, a Fourier transformed TEM photograph as the inset of FIG. 4d illustrated that a white elliptical trace indicating the anatase (101) plane is observed around diffraction points. Meanwhile, the bare $TiO_2$ showed that the interplanar distance is 0.354 nm near the surface thereof, which slightly increases as compared to the existing interplanar distance. Based on the above-observed results of the changes in light absorption properties and crystallinity, effects of the mixed gas plasma treatment proposed in the present invention have been mostly concentrated on the surface of particles, as shown in FIG. 2. On the other hand, the inside of the particle maintains inherent characteristics of the anatase phase $TiO_2$.

Figure 5:
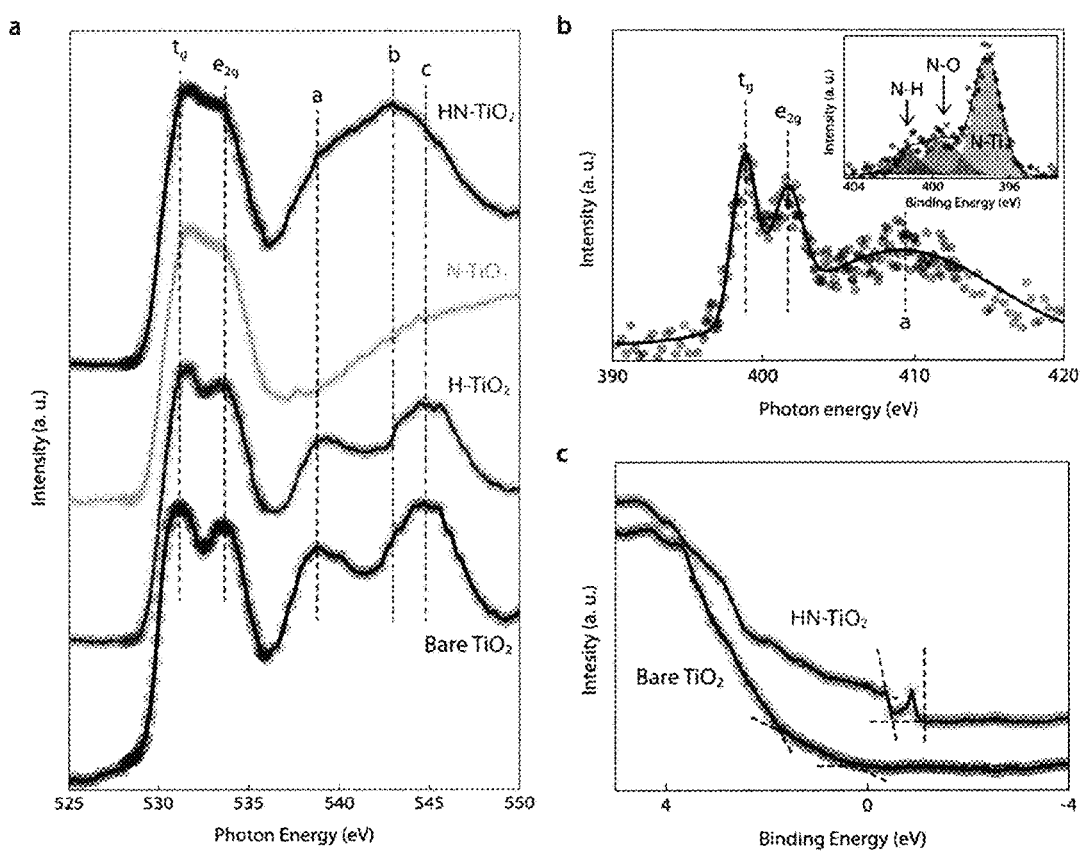
FIG. 5 is views illustrating: a) NEXAFS measurement results of oxygen K-edge of samples treated with hydrogen (H—$TiO_2$), nitrogen (N—$TiO_2$) and $H_2/N_2$ mixed gas (HN—$TiO_2$) plasmas, respectively; b) NEXAFS measurement results of nitrogen K-edge of HN—$TiO_2$ sample, and an inset showing XPS measurement of nitrogen is orbital; and c) valance band (VB) XPS measurement results of the sample before and after $H_2/N_2$ mixed gas plasma treatment.

FIG. 5 illustrates measured results of changes in chemical states of elements forming the surface of $TiO_2$ nanoparticles by the gas plasma treatment. Anatase phase $TiO_2$ has titanium 3d orbital and oxygen 2p orbital hybridized by a crystal field effect to form a hybrid orbital level having an energy level in $T_g$ and $e_{2g}$ states above the Fermi energy level. Accordingly, in a near edge X-ray absorption fine structure (NEXAFS) curve obtained by measuring the chemical state of an oxygen K-edge in FIG. 5a, the bare $TiO_2$ showed peaks indicating $T_g$ and $e_{2g}$ levels at a photon energy in a range of 530 eV to 535 eV. Further, it was observed that a and c peaks are present in a hybrid orbital level formed by hybridization of an oxygen 2p orbital and titanium 4s or 4p orbital at a high photon energy. Such specific peaks observed in the anatase phase $TiO_2$ did not show any significant differences when performing an $H_2$ gas plasma treatment (H—$TiO_2$). However, when performing an $N_2$ gas plasma treatment (N—$TiO_2$), the positions of $t_g$ and $e_{2g}$ level peaks moved toward the right side and the depth of a valley between these two peaks was decreased. Further, it was observed that the form of the a and c peaks is significantly changed. The above changes are further increased when performing the $H_2/N_2$ mixed gas plasma treatment (HN—$TiO_2$), and a new peak was observed at the b position between the a and c peaks. As a result, an overall outline of the curve was altered into the morphology similar to the oxygen K-edge spectrum of surface-oxidized titanium nitride (TiN) or titanium oxynitride (TiON).

Referring to the NEXAFS curve of a nitrogen K-edge of the HN—$TiO_2$ sample shown in FIG. 5b, it was observed that a nitrogen introduced by the plasma treatment is combined with a titanium to form a new orbital level. As described for the case of oxygen, two peaks found near 400 eV among such orbital levels exhibit a $t_g$ and $e_{2g}$ hybrid orbital level generated by the hybridization of the nitrogen 2p orbital and titanium 3d orbital. Likewise, 'a' peak near 410 eV is also a specific peak which is generated in the hybrid orbital level and formed by the hybridization of the nitrogen 2p orbital and titanium 4s or 4p orbital. The inset of FIG. 5b shows the chemical status of the nitrogen 1 s orbital measured by X-ray photoelectron spectroscopy (XPS). Similar to the NEXAFS results, the nitrogen-titanium (N—Ti) combined peak was the highest peak and other nitrogen-oxygen (N—O) and nitrogen-hydrogen (N—H) combined peaks were further confirmed. Such nitrogen XPS and NEXAFS measured results demonstrated that nitrogen is introduced in two different modes, that is, an oxygen atom is substituted with nitrogen in an anatase crystal or nitrogen invades between oxygen and titanium atoms, and different energy levels are formed in relation to the respective introduction conditions. Meanwhile, it was found that the intensity of peaks indicating oxygen vacancy in the HN—$TiO_2$ sample sharply increases, compared to the bare $TiO_2$, by measuring the chemical states of the XPS oxygen Is orbital.

In order to determine the position of the energy level generated by such a nitrogen introduction effect as described above, a valance band XPS was measured and the measured result is shown in FIG. 5c. It was found that HN—$TiO_2$ has a VBM level at a 0.6 eV lower position, as compared to the bare $TiO_2$. Further, due to an energy level newly formed at a 0.6 eV lower position than the VBM, a sharp peak was observed. As such, new energy levels discovered in HN—$TiO_2$ was predicted as energy levels resulted from the binding of nitrogen and hydrogen atoms to titanium atoms, and it was demonstrated that such new energy levels are formed by Ti—$N_s$ (substitutional nitrogen) bond and Ti—$N_iH$ (hydrogen bonded interstitial nitrogen) bond, respectively, according to a calculation method based on density functional theory (DFT) (see next paragraph and FIGS. 6 and 7). With reference to the results in FIG. 4a, assuming that a band-gap of the anatase phase $TiO_2$ is 3.27 eV, band-gaps due to the energy level formed by the combination of Ti—$N_s$ and Ti—$N_i$ in the HN—$TiO_2$ sample measured by VB XPS have the size of 2.67 eV and 1.97 eV, respectively. It was determined that these results are very similar to 2.71 eV and 1.92 eV, respectively, which are the band-gap levels of HN—$TiO_2$ calculated on the basis of light absorption properties in FIG. 4a.

Figure 6:
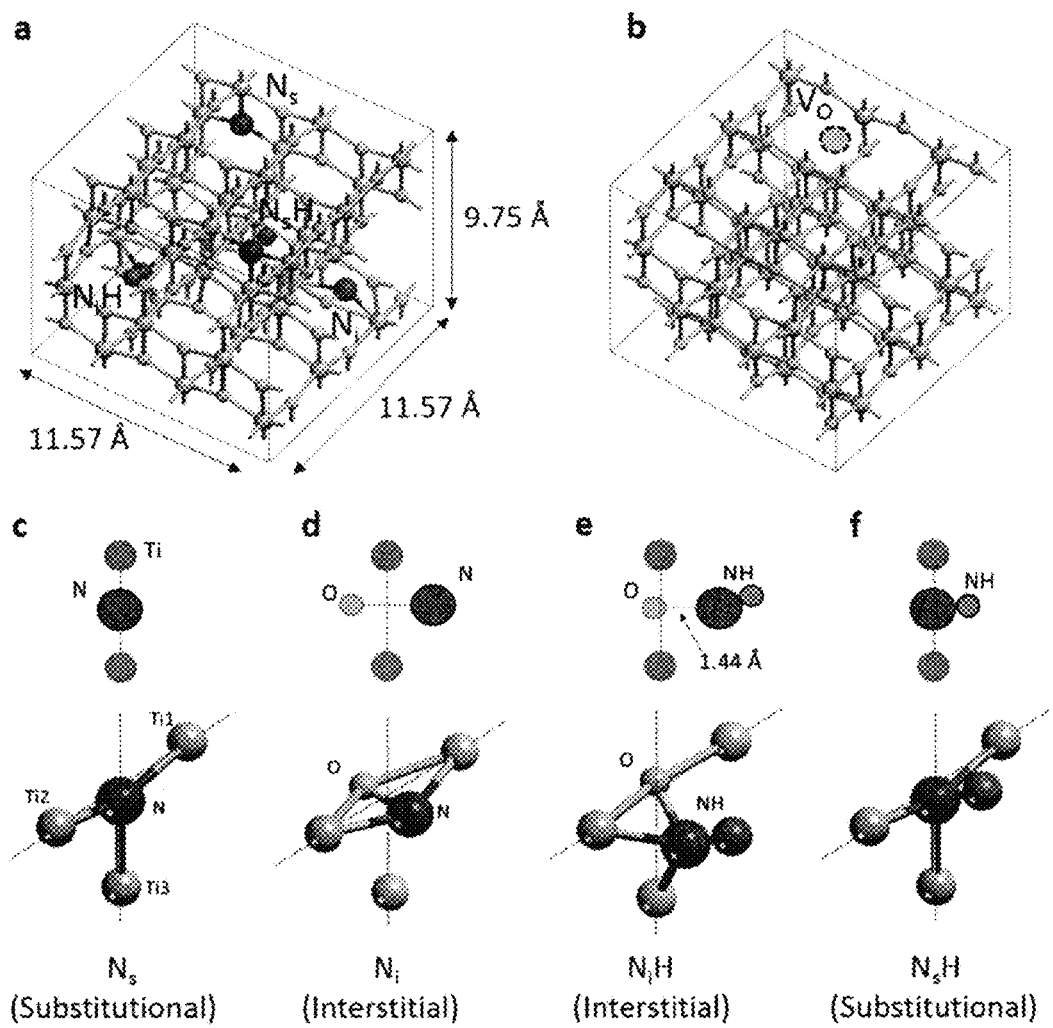
FIG. 6 is views illustrating: a) a crystal model of anatase $TiO_2$ crystal including both of substitutional or interstitial nitrogen and hydrogen; b) a crystal model of anatase $TiO_2$ crystal including an oxygen vacancy ($V_o$); c) substitutional nitrogen ($N_s$); d) interstitial nitrogen ($N_i$); e) interstitial hydrogen-bonded nitrogen ($N_iH$); and f) substitutional hydrogen-bonded nitrogen ($N_sH$)
Figure 7:
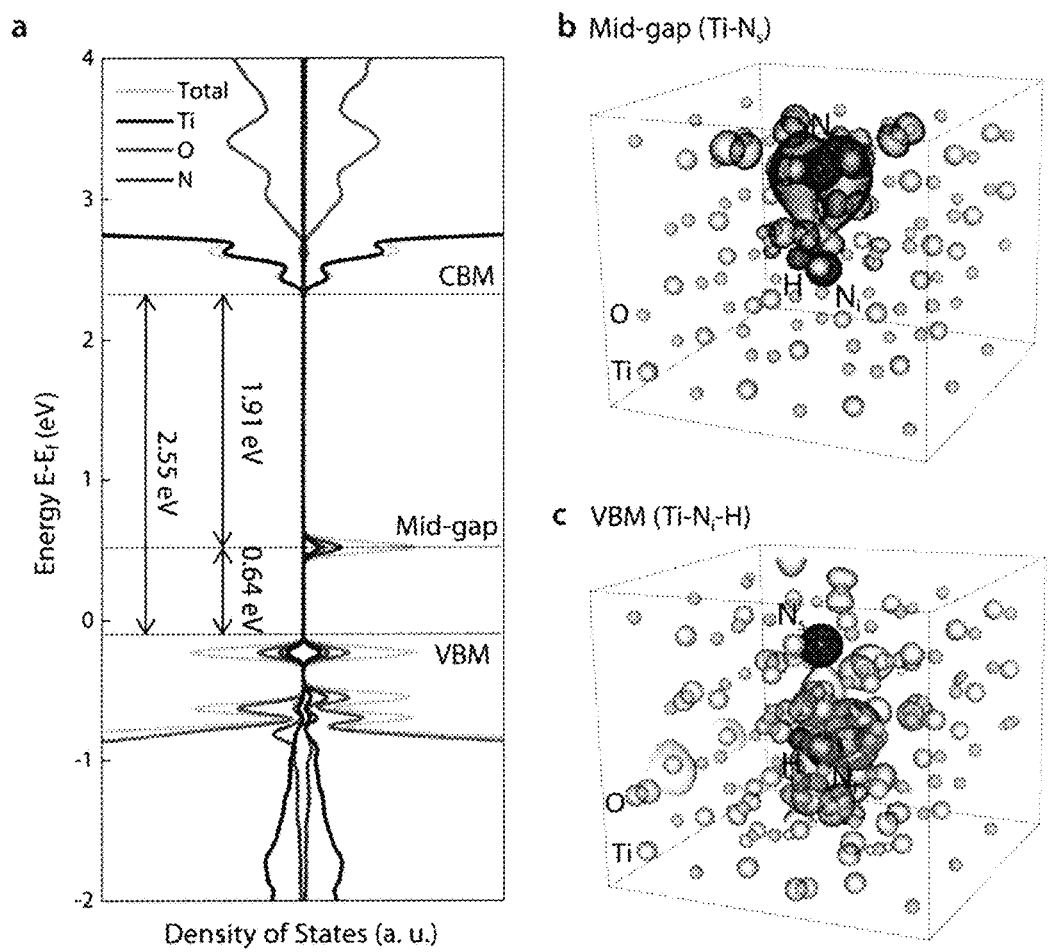

FIG. 6 illustrates a theoretical crystal structure formed through the density functional theory in order to deduce an energy band structure of the anatase $TiO_2$ containing nitrogen and hydrogen inserted therein. As shown in FIGS. 6c and 6d, it was estimated that the nitrogen may be present in substitutional or interstitial form at the position of oxygen in the anatase $TiO_2$ crystal. However, as shown in FIG. 6e or 6f, the hydrogen could not be present in the crystal unless it has been bound to the nitrogen. In other cases, the hydrogen was bonded together to form a hydrogen molecule or was bound to oxygen to form $H_2O$, thus being discharged out of the crystal. Among different crystal models including $N_s$, $N_i$, $N_sH$, $N_iH$ bonds introduced therein separately or in combination, a band structure only in the crystal model including both of $N_s$ and $N_iH$ together has exhibited a value very similar to the band structure calculated using experimental values within an error range of 0.2 eV. In the band structure shown in FIG. 7a, as a result of reflecting a local distribution of the electron states at a mid-gap level (FIG. 7b) and a VBM (FIG. 7c) level into the crystal structure, it was found that Ti—$N_s$ bond forms the mid-gap level and Ti—$N_iH$ bond forms the VBM level, respectively. Meanwhile, a flat band level difference between two samples calculated by the Mott-Schottky measurement method was measured as 0.03 eV, therefore, it was determined that the CBM level of HN—$TiO_2$ was changed by −0.03 eV, compared to the bare $TiO_2$.

In other words, a structure of the band-gap is changed by reacting the metal oxide with the gas to make the substitutional nitrogen and oxygen vacancies to form the mid-gap, and the interstitial hydrogen nitride raises a valence band maximum (VBM) level to decrease a size of the band-gap and extend a wavelength range in which electron-hole pairs are generated by sensing light, so as to absorb UV ray and light in the visible light region.

Figure 3:
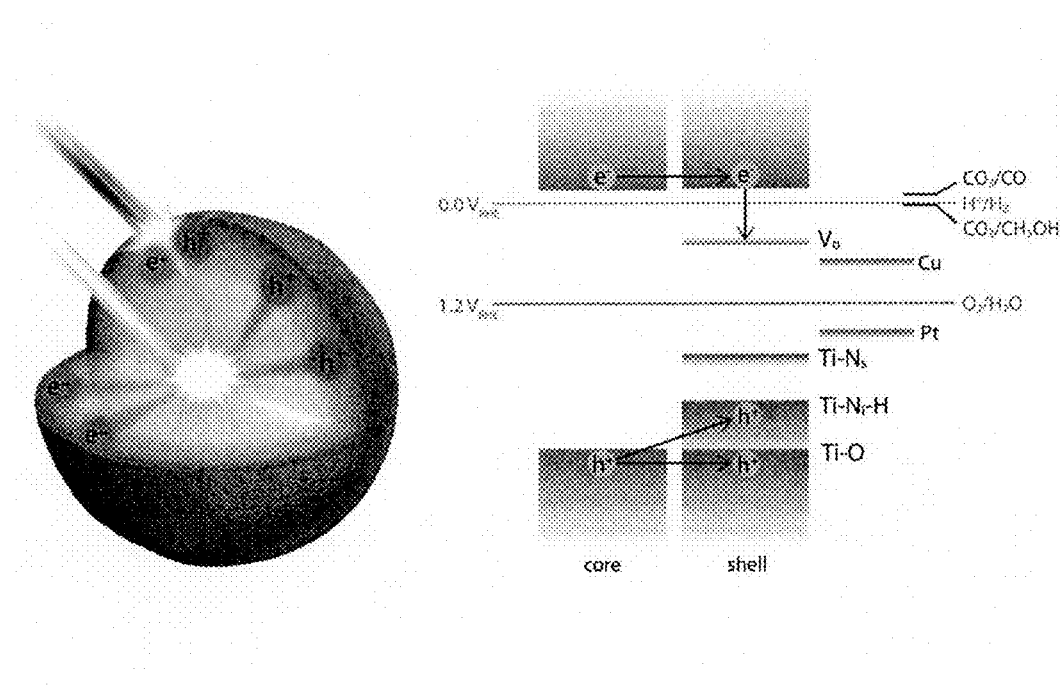
FIG. 3 is a view illustrating energy levels created at the surface of the metal oxide nanoparticles by the mixed gas plasma treatment, and energy levels of Cu and Pt in co-catalyst used for carbon dioxide conversion, as compared to an energy level of reversible hydrogen electrode (RHE) level, as well as improved electron-hole transfer and separation effects resulting from the same.

Referring to the above data, FIG. 3 illustrates a band-gap structure including all energy levels of HN—$TiO_2$ sample, as compared to a reversible hydrogen electrode (RHE) level. For reference, $V_o$ represents a characteristic of metal oxides hydrogenated at an energy level created at 0.8 eV below the CBM level if a density of oxygen vacancies in an n-type semiconductor metal oxide is too high. Due to such $V_o$ energy level, a color of the plasma treated sample became black. Briefly, because of Ti—$N_s$, $V_o$ energy level formed on the surface of the particle shown in FIG. 3, there have been achieved effects of actively transferring electron-hole pairs excited in the particle to the surface of particles, and raising the VBM level of $TiO_2$ by Ti—$N_iH$ to decrease a band-gap size, therefore, a wavelength range in which electron-hole pairs are generated by sensing light was extended to a wavelength range of about 470 nm in the visible light region.

Figure 8:
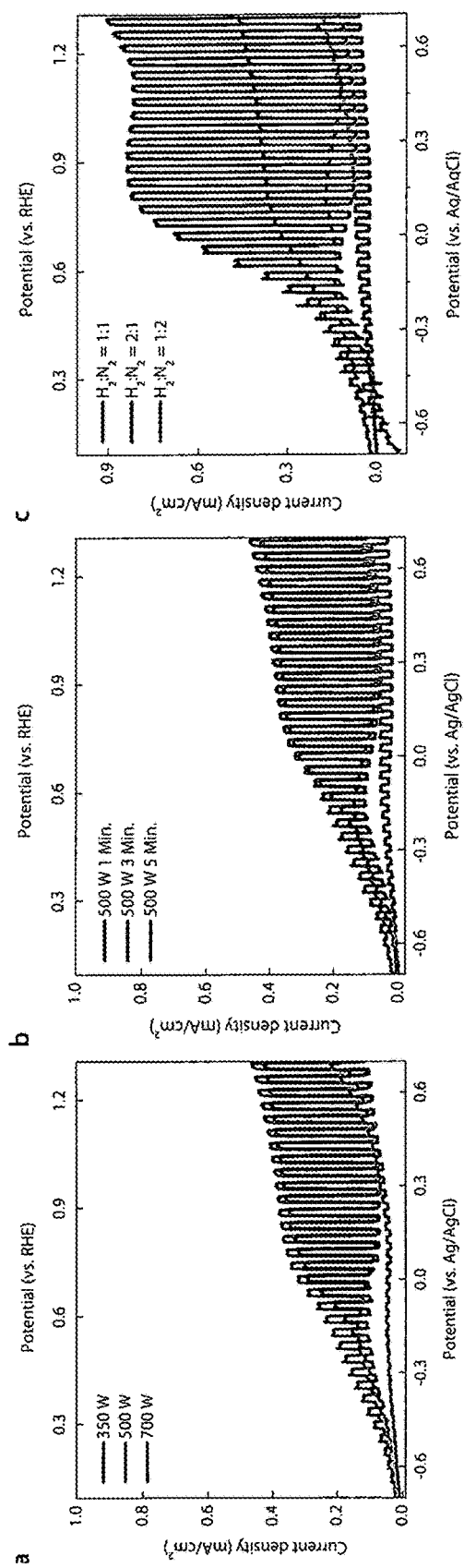
FIG. 8 is views illustrating changes in photoelectrochemical catalytic properties of the sample along with changes in process conditions of the $H_2/N_2$ mixed gas plasma treatment such as: a) a plasma output power; b) a processing time; and c) a mixing ratio of $H_2$ and $N_2$ gases, respectively, wherein the above changes are expressed by photocurrent-voltage curves with 0.1 M $NaClO_4$ (pH 7) aqueous solution.

FIG. 8 illustrates conditions for $H_2/N_2$ mixed gas plasma treatment optimized according to a photoelectrochemical catalysis evaluation using 0.1 M $NaClO_4$ aqueous solution (pH 7) as an electrolyte, a platinum counter electrode and an Ag/AgCl reference electrode. As a result of measuring a water-oxidation photocurrent amount with variations in a plasma generation output (FIG. 6a), a plasma treatment time (FIG. 6b) and a mixing ratio of $H_2/N_2$ gas (FIG. 6c), it was observed that the highest photocatalytic performance is achieved when a plasma ball generated using the $H_2/N_2$ mixed gas in a mixing ratio of hydrogen:nitrogen=1:2 with 500 W output power at room temperature contacts with the surface of the metal oxide thin film for 3 minutes to treat the same.

Figure 9:
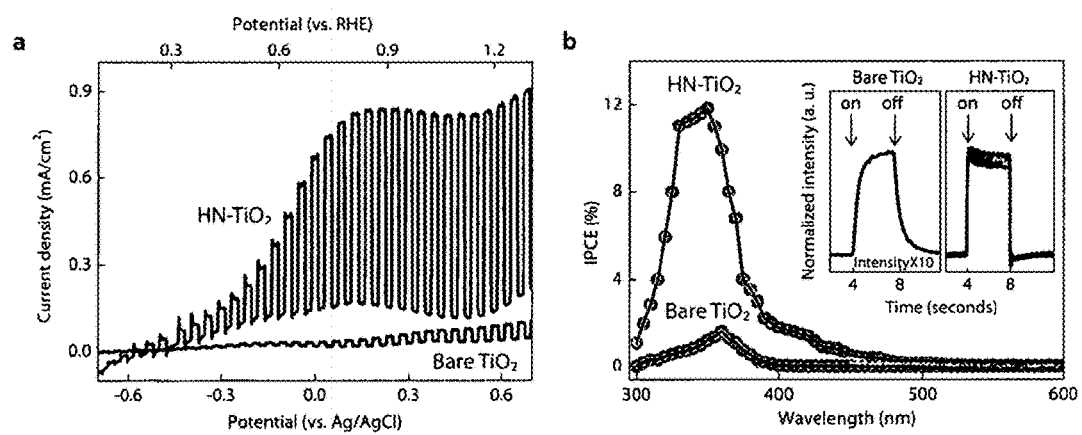
FIG. 9 is views illustrating: a) photoelectrochemical catalytic properties of a sample (HN—$TiO_2$) on which the gas plasma treatment is executed using the mixed gas of hydrogen and nitrogen in a mixing ratio of 2:1 at 500 W output power for 3 minutes and another sample (bare $TiO_2$) without any treatment, which are expressed by the photocurrent-voltage curves with 0.1 M $NaClO_4$ (pH 7) aqueous solution; and b) measured results of photoreaction efficiency for each wavelength range for each sample, and the insets showing photo-reactivity for each sample by normalizing an photocurrent amount in photocurrent-time curves.

FIG. 9 also illustrates comparison and evaluation results of photoelectrochemical catalysis reactivity of the sample (HN—$TiO_2$) with the plasma treatment under the optimum condition induced in FIG. 8 and the untreated sample (bare $TiO_2$). In the photocurrent-voltage curve in FIG. 9a, it was observed that the photocurrent amount of the HN—$TiO_2$ sample emitting light at 1.23 $V_{RHE}$ (potential for degrading water and generating hydrogen and oxygen) has increased by 9 times or more, compared to the bare $TiO_2$. FIG. 9b illustrates photoreaction efficiency with respect to wavelengths of light. Herein, it was observed that the bare $TiO_2$ exhibits photoreaction in only the UV light range (300 nm to 400 nm) whereas HN—TiO$_2$ has an extended range of reaction up to the visible light region. In particular, it was found that an integral value of the visible light region (400 nm to 600 nm) curve only of the HN—TiO$_2$ sample is larger than an integral value of a curve as the sum of overall wavelength ranges of the bare TiO$_2$. In fact, as a result of separating light with UV wavelength and light with visible light wavelength from each other, then, measuring the respective photocurrent amounts, the HN—TiO$_2$ sample showed the photocurrent amount (0.094 mA cm$^{-2}$) generated from the light only at the visible light wavelength, which is higher than the photocurrent amount of the bare TiO$_2$ (0.041 mA cm$^{-2}$) generated by the light with the sum of UV light and visible light wavelengths. Meanwhile, photoreactivity of the HN—TiO$_2$ sample is gradually decreased as the number of waves per wavelength increases in the visible light region, then, rapidly approaches 0% from a point at 470 nm, and this result demonstrated that the VBM is raised due to the above-described Ti—N$_s$ binding to thus attain effects of decreasing the band-gap to about 2.7 eV.

The inset of FIG. 9*b* illustrates a graph of chopped photocurrent time curve with normalization of their photocurrent intensity. Herein, it was observed that the HN—TiO$_2$ sample exhibits instant excitation and relaxation of the generated photocurrent depending on light irradiation and blocking thereof. On the other hand, the photocurrent of the bare TiO$_2$ was very slowly increased to the maximum photocurrent value when becoming light, while being decreased slowly to the minimum value even if the light emission is blocked. The reason of such a phenomenon is that the bare TiO$_2$ has a very low transportation rate of electrons and holes generated by the light from the inside to the outside of a particle, as compared to that of HN—TiO$_2$, therefore, a time required to reach a steady-state in the amounts of electrons and holes moving toward the outside of the particle is also much longer than that of HN—TiO$_2$. The above-described slow transfer phenomenon of the electron-hole has caused such a phenomenon that the electrons and holes still accumulated inside the particle without moving to the outside thereof are transferred to the outside and slowly decreased as if the photoreaction still exists even after the light is blocked. Further, referring to an HN—TiO$_2$ photocurrent curve, since an overshooting phenomenon occurs during light irradiation while a lower value of current amount than the dark current value in the steady-state is observed during light blocking, it was determined that the HN—TiO$_2$ sample involves a Shockley-Read-Hall (SRH) recombination. The SRH recombination is a phenomenon occurring when an electron donor or electron acceptor level is present at a deep level inside the band-gap of a semiconductor material. In the present case, this was observed as an effect occurring due to Ti—N$_i$ and V$_o$ energy levels shown in the graph of FIG. 3. Consequently, an electron carrier density is raised as oxygen vacancies are increased, and the electron-hole pairs generated by sensitization of the light in the visible light region are also increased. Furthermore, due to the energy level generated at the surface of the particle, the electrons and holes generated inside the particle are rapidly moved toward the outside. Finally, the number of electrons and holes participating in the oxidation/reduction reaction are increased to thus improve photocatalytic efficiency.

Figure 10:
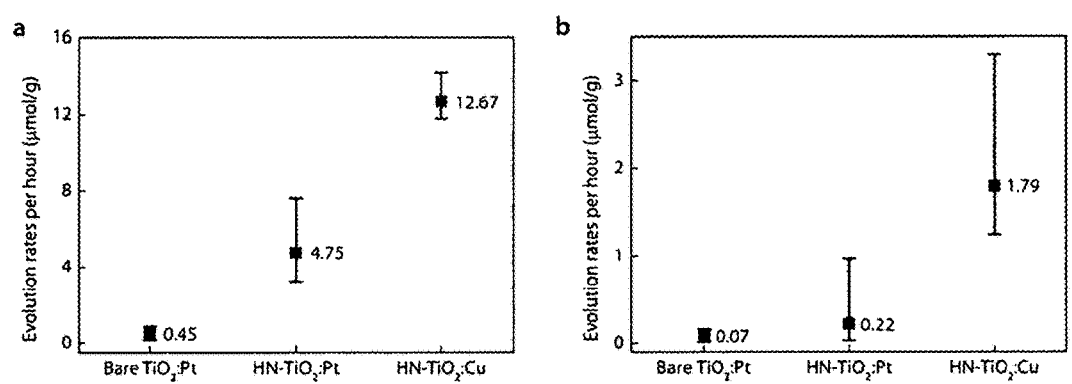
FIG. 10 is views illustrating amounts of C1 fuel products, that is: a) carbon monoxide; and b) methanol, which are converted from carbon dioxide and water through a photochemical reaction for 10 hours without any oxidant and reductant.

FIG. 10 illustrates results of testing a production amount of a C1 compound fuel through a photochemical reaction in a stainless steel rector, in which carbon dioxide is saturated and sealed, and by using the present inventive material having a high photocurrent amount. According to the experimental method described in the example of the present invention, it was confirmed that a great amount of carbon monoxide and methanol was generated from carbon dioxide through a photochemical conversion reaction. In particular, it was demonstrated that a sample using copper metal as a co-catalyst (HN—TiO$_2$:Cu) exhibited very higher conversion efficiency by 25 times or more and 8 times or more, respectively, than other samples using a platinum catalyst (bare-TiO$_2$:Pt, HN—TiO$_2$:Pt). Based on these results, it could be understood that photocatalytic efficiency of TiO$_2$ material may be maximized according to the present inventive process.

As shown in FIG. 10, conversion and production amounts of carbon dioxide and water into a fuel, that is, C1 compound such as a) carbon monoxide, b) methanol, etc. through the photochemical reaction for 10 hours without any oxidant and reductant are shown in Table 1 below.

TABLE 1

| Section | Production amount per time (μmol/g) | |
|---|---|---|
| | a (CO; carbon monoxide) | b (CH$_3$OH; methanol) |
| Bare TiO$_2$—Pt | 0.45 | 0.07 |
| HN—TiO$_2$—Pt | 4.75 | 0.22 |
| HN—TiO$_2$—Cu | 12.67 | 1.79 |

From the above results, it was confirmed that a great amount of C1 compounds, that is, a) carbon monoxide and b) methanol were generated from carbon dioxide through the photochemical conversion reaction by the experimental procedures described in the examples of the present invention. In particular, it was demonstrated that the sample using copper metal as a co-catalyst (HN—TiO$_2$:Cu) exhibited very higher conversion efficiency by 25 times or more and 8 times or more, respectively, than other samples using a platinum catalyst (bare-TiO$_2$:Pt, HN—TiO$_2$:Pt). Alternatively, Cu and Zn among other transition metals have also accomplished the results similar to the above description. Based on the above-demonstrated results, it could be confirmed that the photocatalytic efficiency of TiO$_2$ material was maximized by the present inventive process. Although not listed in Table 1 above, the C1 compound may further include methane CH$_4$ and formic acid HCOOH.

Figure 11:
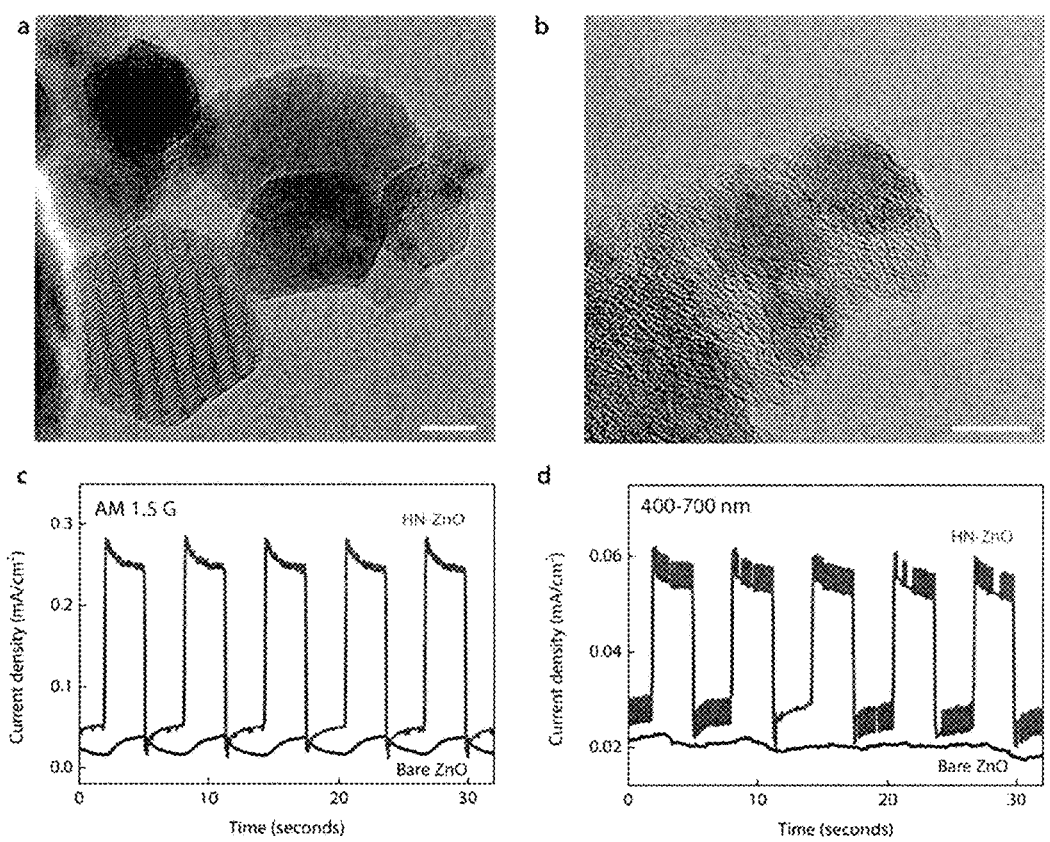
FIG. 11 is views illustrating: TEM photographs of ZnO nanoparticles a) before and b) after mixed gas plasma treatment; and photocurrent-time curves showing photocurrent amounts generated from ZnO nanoparticles: c) under incident solar simulator; or d) under incident visible light, before and after mixed gas plasma treatment.
Figure 12:
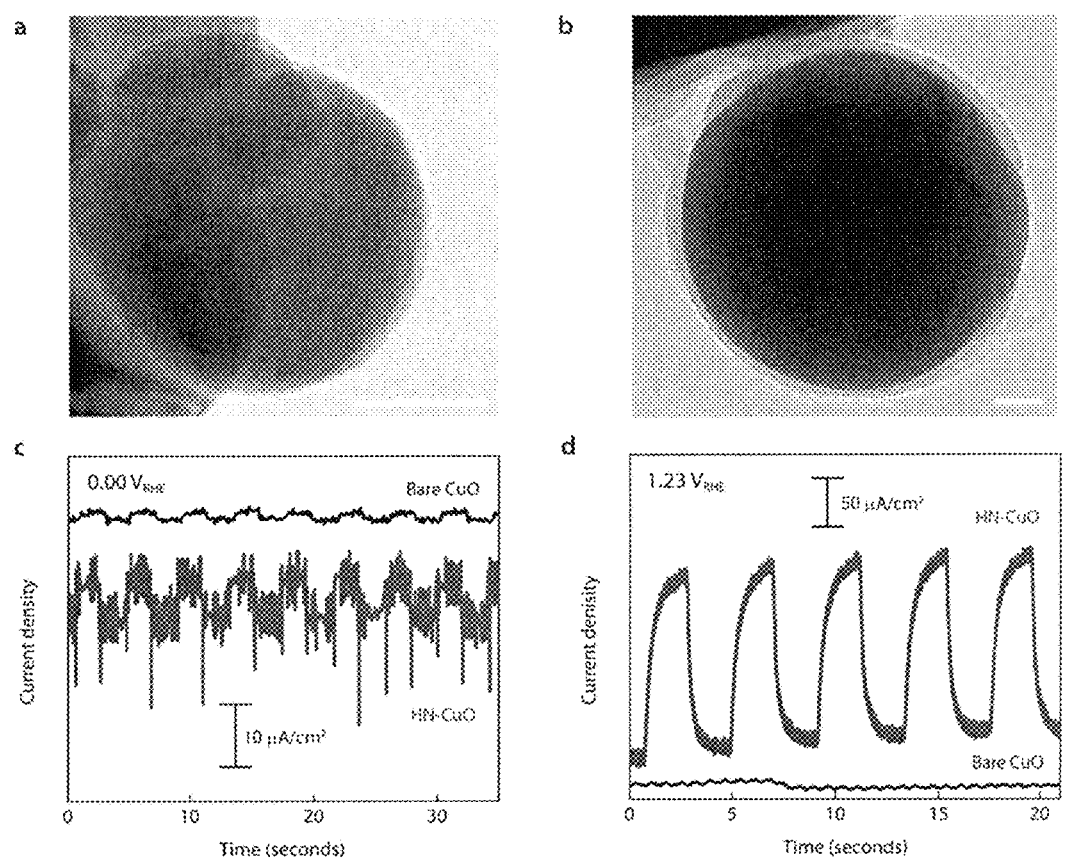
FIG. 12 is views illustrating: TEM photographs of CuO nanoparticles a) before and b) after mixed gas plasma treatment; and photocurrent-time curves showing photocurrent amounts generated from CuO nanoparticles: c) at a hydrogen generation potential; or d) at an oxygen generation potential, under incident solar simulator before and after mixed gas plasma treatment.

In order to confirm effects obtained by the mixed gas plasma treatment of the present invention through a test for evaluating applicability of the mixed gas plasma treatment to various metal oxide semiconductor materials other than TiO$_2$, the same conditions of the examples according to the present invention were applied to zinc oxide (ZnO) nanoparticles and copper oxide (CuO) nanoparticles, and results thereof are shown in FIGS. 11 and 12. Similar to the case of the above-described TiO$_2$ nanoparticles, the surface of particle became amorphous through the mixed gas plasma treatment to thus change the core-shell structure, which was determined by TEM measurement. A band-gap of pure ZnO nanoparticle was about 3.2 eV and, as same to TiO$_2$, therefore, the photocurrent is formed only in UV light at a wavelength band of 400 nm or more. However, according to the mixed gas plasma treatment of the present invention, it could be found that the photocurrent is formed even in the light at a wavelength range of 400 to 700 nm in the visible light region (FIG. 11*d*). Further, it was determined that the plasma treated ZnO could generate the photocurrent in an amount increased by 7 times even under incident solar simulator (AM 1.5G) including both of UV ray and visible light, as compared to pure ZnO nanoparticles (FIG. 11c). Since the pure CuO nanoparticle has a band-gap of 1.3 eV, the light sensitive wavelength range is not increased by the plasma treatment, unlike $TiO_2$ or ZnO nanoparticle. However, it was found that the amount of photocurrent generation was increased under the same incident light condition (FIG. 12c). Furthermore, it was demonstrated that the CuO nanoparticle originally exhibiting only p-type characteristics has also showed n-type characteristics through the mixed gas plasma treatment. Accordingly, as shown in FIG. 12d, CuO nanoparticle originally having hydrogen reduction ability could oxidize oxygen even at the potential of oxygen oxidation (1.23 $V_{RHE}$) and generate photocurrent amount. Through such a series of experiments as described above, it was demonstrated that the mixed gas plasma treatment of the present invention can be applied to a broad range of metal oxide semiconductor materials.

The terms or words used in the specification and claims of the present invention should not be construed as limited to a lexical meaning, and should be understood as appropriate notions by the inventor based on that he/she is able to define terms to describe his/her invention in the best way to be seen by others. Therefore, embodiments and drawings described herein are simply exemplary and not exhaustive, and it will be understood that various modifications and equivalents may be made to take the place of the embodiments.

By further depositing a metal such as Cu or Pt on the surface of —NH, H plasma treated core-shell metal oxide using the single process of the present invention, the resulting material may be utilized not only in a direct conversion catalyst for converting solar energy into a compound such as $CO_2$ conversion but also in a cathode material for electrochemical energy conversion and storage fields, as well as other applications directly associated with metal oxide semiconductor catalysts such as a gas sensing catalytic material. Further, non-harmful effects to the human body and environment and fluorescent light sensitive properties may be practically utilized in a variety of applications including, for example: building interior/exterior materials; semi-permanent anti-fouling agents for garments, masks, etc.; offensive odor removers; preservatives; or tooth whitening agents. Moreover, due to strong UV reactivity and high organic matter oxidation effects, the metal oxide material of the present invention may be used as an air or water purification catalyst utilizing UV LED light.

In addition, due to convenience and low costs of the single process, easiness in mass production and efficient improvement of characteristics, the present invention may be highly utilized in a broad range of applications.

What is claimed is:

1. A method for manufacturing a transition metal oxide photocatalyst having a core-shell energy band structure to improve solar energy conversion efficiency by utilizing a wide range of sunlight from ultraviolet ray to visible light comprising:

a first process of performing heat treatment on a metal oxide semiconductor having a band-gap to form a nanoparticle thin film layer;

a second process of contacting a plasma ball including mixed gas in a substitutional NH or NHx radical state by a plasma reaction under a hydrogen and nitrogen gas atmosphere with a surface of nanoparticles of the nanoparticle thin film layer to simultaneously generate a NH functional group and oxygen vacancies formed by hydrogenation, so as to prepare a core-shell metal oxide capable of absorbing UV ray and visible light; and a third process of further depositing a transition metal on surfaces of core-shell nanoparticles of the nanoparticle thin film layer to produce a photocatalyst of metal oxide-transition metal having a HN-core-shell structure for energy conversion.

2. The method according to claim 1, wherein the metal oxide and the transition metal include at least one element selected from Ti, V, Fe, Cu, Zn, Ta, W and Bi.

3. The method according to claim 1, wherein the substitutional NH or NHx radical is a plasma ball formed of NH or NHx mixed gas by plasma treatment.

4. The method according to claim 1, wherein the gas plasma treatment in the second process is executed in a hydrogen gas to nitrogen gas ratio of 1:1, 1:2 or 1:3.

5. The method according to claim 1, wherein the second process is executed by contacting the plasma ball of substitutional hydrogen nitride mixed gas, which is formed by a plasma reaction in a single process at room temperature, to the surface of the metal oxide thin film or the particles, so as to form a core-shell structure.

6. The method according to claim 1, wherein a structure of the band-gap is changed by reacting the metal oxide with the gas to make the substitutional nitrogen and oxygen vacancies to form the mid-gap, and the interstitial hydrogen nitride raises a valence band maximum (VBM) level to decrease a size of the band-gap and extend a wavelength range in which electron-hole pairs are generated by sensing light, so as to absorb UV ray and light in the visible light region.

7. A transition metal oxide photocatalyst having a core-shell energy band structure to improve solar energy conversion efficiency by utilizing a wide range of sunlight from ultraviolet ray to visible light manufactured by the method according to claim 1.

8. The transition metal oxide photocatalyst according to claim 7, wherein the transition metal oxide photocatalyst is used to generate a solar energy compound selected from the group consisting of carbon monoxide, methanol, formic acid and methane from water and carbon dioxide using a light.

9. The transition metal oxide photocatalyst according to claim 7, wherein the transition metal oxide photocatalyst is used to generate a C1 compound selected from the group consisting of methanol, methane, formic acid and carbon monoxide by a photochemical reaction.

* * * * *